(12) United States Patent
Rao

(10) Patent No.: US 11,750,518 B2
(45) Date of Patent: Sep. 5, 2023

(54) ELASTIC MODIFICATION OF APPLICATION INSTANCES IN A NETWORK VISIBILITY INFRASTRUCTURE

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 283 days.

(21) Appl. No.: 17/104,893

(22) Filed: Nov. 25, 2020

(65) Prior Publication Data

US 2021/0083978 A1 Mar. 18, 2021

Related U.S. Application Data

(63) Continuation of application No. 16/119,093, filed on Aug. 31, 2018, now Pat. No. 10,855,590.

(51) Int. Cl.
*H04L 12/801* (2013.01)
*H04L 12/743* (2013.01)
*H04L 47/12* (2022.01)
*H04L 45/7453* (2022.01)

(52) U.S. Cl.
CPC .......... *H04L 47/12* (2013.01); *H04L 45/7453* (2013.01)

(58) Field of Classification Search
CPC ............................ H04L 47/12; H04L 45/7453
See application file for complete search history.

(56) References Cited

U.S. PATENT DOCUMENTS

| 9,929,945 B2 | 3/2018 | Schultz et al. |
| 2014/0310418 A1* | 10/2014 | Sorenson, III ...... H04L 67/1038 709/226 |
| 2017/0019335 A1 | 1/2017 | Schultz et al. |

OTHER PUBLICATIONS

Notice of Allowance dated Oct. 2, 2020 for U.S. Appl. No. 16/119,093, filed Aug. 31, 2018, 9 pages., dated Oct. 2, 2020.
Corrected Notice of Allowance dated Oct. 6, 2020 for U.S. Appl. No. 16/119,093, filed Aug. 31, 2018, 4 pages., dated Oct. 6, 2020.
Extended EP Search Report for related EP Patent Application 19194796.9, dated Apr. 2, 2020, 15 pages., dated Apr. 2, 2020.
Non-Final Office Action dated Jun. 12, 2020 for U.S. Appl. No. 16/119,093 of Anil Rao, filed Aug. 31, 2018, 11 pages., dated Jun. 12, 2020.
European Search Report dated Nov. 28, 2019 for EP Patent Application No. 19194796.9, dated Nov. 28, 2019.
(Continued)

*Primary Examiner* — Melvin C Marcelo
(74) *Attorney, Agent, or Firm* — Perkins Coie LLP

(57) ABSTRACT

Introduced here are network visibility platforms having total processing capacity that can be dynamically varied in response to determining how much network traffic is currently under consideration. A visibility platform can include one or more network appliances, each of which includes at least one instance of an application configured to process data packets. Rather than forward all traffic to a single application instance for processing, the traffic can instead be distributed amongst a pool of application instances to collectively ensure that no data packets are dropped due to over-congestion. Moreover, the visibility platform can be designed such that application instances are elastically added/removed, as necessary, based on the volume of traffic currently under consideration.

16 Claims, 15 Drawing Sheets

1000

Acquire virtualized traffic indicative of data packets traversing a virtual machine
1001

Compare the virtualized traffic to available processing capacity of an application configured to process the virtualized traffic
1002

Modify the number of existing instances of the application to dynamically account for variations in virtualized traffic volume
1003

(56) References Cited

OTHER PUBLICATIONS

Caballer, Miguel, et al., "EC3: Elastic Cloud Computing Cluster", Journal of Computer and System Sciences, Academic Press, Inc., London, GB, vol. 79, No. 8, Jul. 1, 2013 (Jul. 1, 2013), pp. 1341-1351, XP028679685, ISSN: 0022-0000.

Holmgren, Fredrik, et al., "Interactive Visual Analysis of Networked Systems: Workflows for Two Industrial Domains", XP055681522, Retrieved from the Internet: URL:https://www.diva-portal.org/smash/get/diva2:104250/FULLTEXT01.pdf, 32 pages.

Lodde, Andreas, "Network Visualisation", XP055681524, Retrieved from the Internet: URL:http://www.mmi.ifi.lmu.de/lehre/ws0809/hs/docs/lodde.pdf [retrieved on Mar. 31, 2020], 7 pages.

* cited by examiner

1000

Acquire virtualized traffic indicative of data packets traversing a virtual machine
1001

Compare the virtualized traffic to available processing capacity of an application configured to process the virtualized traffic
1002

Modify the number of existing instances of the application to dynamically account for variations in virtualized traffic volume
1003

FIGURE 10

ELASTIC MODIFICATION OF APPLICATION INSTANCES IN A NETWORK VISIBILITY INFRASTRUCTURE

CROSS-REFERENCE TO RELATED APPLICATION

This application is a continuation of U.S. patent application Ser. No. 16/119,093, that was filed on Aug. 31, 2018, issued as U.S. Pat. No. 10,855,590, on Dec. 1, 2020, which is incorporated by reference herein in its entirety.

TECHNICAL FIELD

At least one embodiment of the present disclosure pertains to techniques for elastically modifying the number of instances of a software application based on the volume of traffic received by a set of network appliances.

BACKGROUND

Data traffic (or simply "traffic") in a computer network can be analyzed to improve real-time decision making for network operations, security techniques, etc. Traffic may be acquired at numerous points by a variety of devices/applications (collectively referred to as "nodes" in the computer network), and then forwarded to a network visibility appliance able to provide extensive visibility of traffic flow. Given the complexity of traffic routed through many infrastructures, various kinds of software application programs (or simply "applications") are often used to provide different data packet manipulation services. For instance, an application may be responsible for creating, aggregating, filtering, examining, and/or modifying the traffic received by a network visibility appliance.

However, applications used in this manner suffer from several drawbacks. For example, while traffic throughput has consistently increased (e.g., due to improvements in network infrastructure), each application deployed on a network appliance has a fixed capacity limitation that restricts how much traffic it can handle at once. As another example, the volume of traffic to be processed by an application will often vary dramatically over time. To increase the processing capacity, a network administrator can either manually update the existing application to a newer version having a higher capacity limitation, or manually replace the existing application with a different application having a higher capacity limitation. But these choices can be costly and, in some instances, may be difficult to implement.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

FIG. 10 depicts a process for modifying the number of application instances accessible to a visibility platform to dynamically account for variations in virtualized traffic volume.

DETAILED DESCRIPTION

Figure 1A:
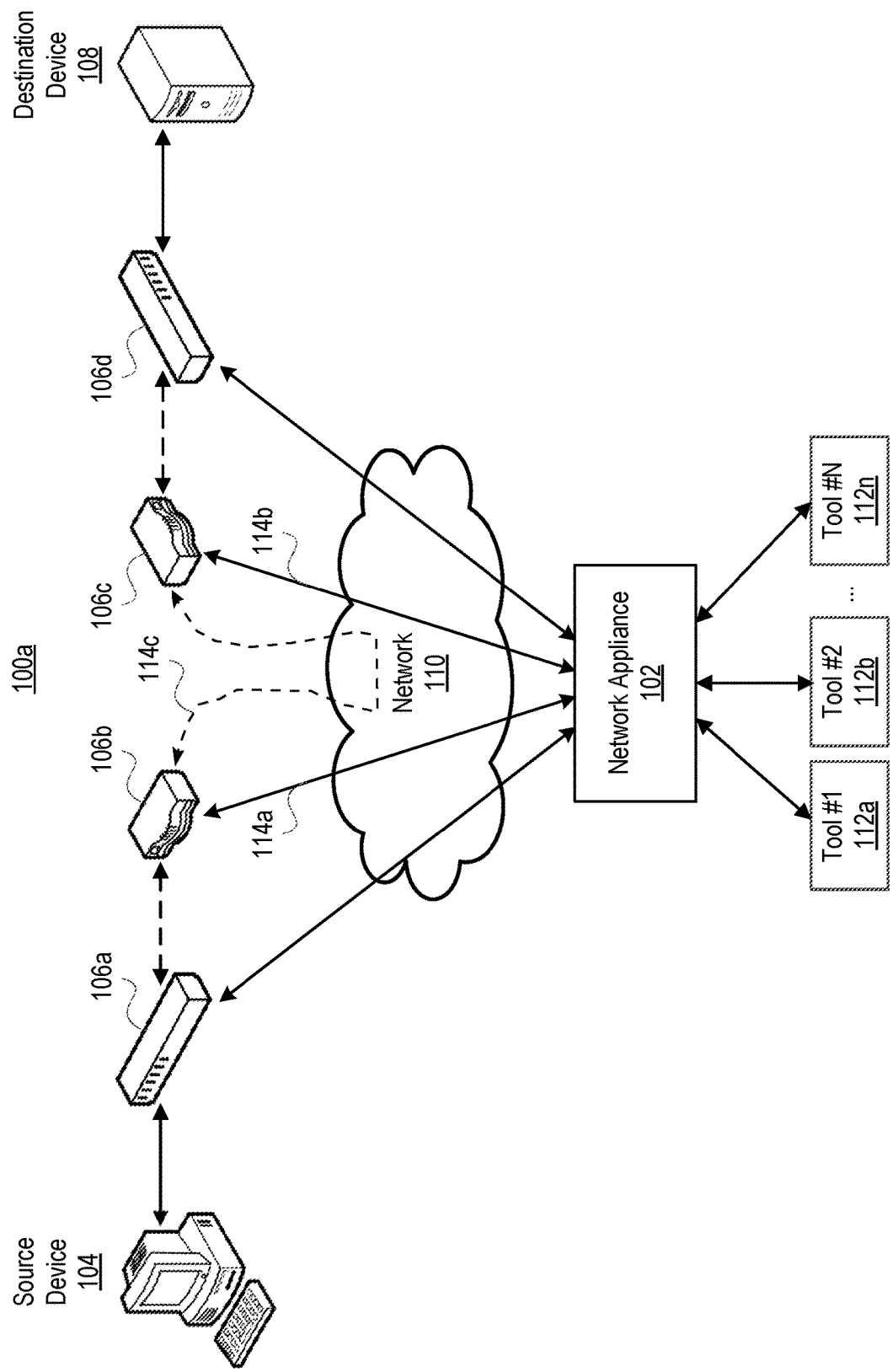
FIG. 1A depicts an example of a network arrangement in which a network appliance receives data packets from multiple devices/applications (collectively referred to as "nodes") in a computer network.

References in this description "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

A network visibility appliance (or simply "network appliance") can be configured to receive data packets from one or more nodes in a computer network. The network appliance may be connected to one or more network tools configured to analyze the data packets (or copies of the data packets), monitor the traffic within the computer network, or block the transmission of abnormal (e.g., malicious) data packets.

Network appliances have traditionally included one or more software application programs (or simply "applications") that provide data packet manipulation services. For example, an application may be configured to manipulate the content of an incoming data packet (e.g., in the header or the payload). As another example, an application may be configured to examine the content of an incoming data packet to glean certain information from it (e.g., regarding a conversation or a session). Thus, an application may be responsible for creating, aggregating, filtering, examining, and/or modifying the traffic received by a network appliance.

However, applications used in this manner suffer from several drawbacks. For example, while traffic throughput has consistently increased (e.g., due to improvements in network infrastructure), each application deployed on a network appliance has a static capacity limitation that restricts how much traffic it can handle at once. As another example, the total volume of traffic to be processed by an application will often vary dramatically over time (e.g., some intervals may require <10% of available processing capacity, while other intervals may require >90% of available processing capacity). To increase the processing capacity, a network administrator can either manually update the existing application to a newer version having a higher capacity limitation, or manually replace the existing application with a different application having a higher capacity limitation.

These choices can be costly and, in some instances, may be difficult to implement. This issue becomes an even larger problem in the context of virtualized traffic. With exponential growth in workloads within physical data centers, many end users have begun moving work processes and data to cloud computing platforms. To monitor the virtualized traffic associated with a single end user, a network appliance may need to receive traffic from hundreds or thousands of virtual machines. Yet a single instance of an application often cannot handle the volume of traffic under consideration.

Introduced here, therefore, are visibility platforms whose total processing capacity can be dynamically varied in response to determining how much traffic is currently under consideration. A visibility platform can include one or more network appliances, each of which includes at least one instance of an application configured to process data packets. Rather than forward all traffic to a single application instance for processing, the traffic can instead be distributed amongst a pool of application instances to collectively ensure that no data packets are dropped due to over-congestion.

The visibility platform can be designed such that application instances can be elastically added/removed, as necessary, based on the volume of traffic currently under consideration. Said another way, application instances can be added/removed as other instances of the application are executing on data traffic. For example, responsive to a determination that the amount of traffic under consideration exceeds an upper processing capacity threshold of the existing application instance(s), one or more new application instances may be added. As another example, responsive to a determination that the amount of traffic under consideration falls below a lower processing capacity threshold of the existing application instance(s), one or more existing application instances may be removed. Thus, the number of application instances in existence may be modified dynamically (e.g., automatically as other instance(s) of the applications are processing data packets) to ensure that an appropriate amount of processing capacity is available without allowing too much processing capacity to remain idle.

Network Appliance Architecture

FIG. 1A depicts an example of a network arrangement 100a in which a network appliance 102 receives data packets from multiple devices/applications (collectively referred to as "nodes") in a computer network 110. The nodes couple a source device 104 (e.g., a desktop computer system) to a destination device 108 (e.g., a server). Thus, the nodes allow data packets to be transmitted between the source device 104 and the destination device 108. Examples of nodes include switches (e.g., switches 106a, 106d), routers (e.g., routers 106b, 106c), network taps, etc.

Each node represents an entry point into the computer network 110. The entry points could be, and often are, from different points within the computer network 110. Generally, at least some of the nodes are operable to transmit data packets received as traffic (or duplicate copies of the data packets) to a network appliance 102 for analysis. Traffic can be directed to the network visibility appliance 102 by a node that provides an entry point into the computer network 110.

Whether a node transmits the original data packets or copies of the original data packets to a device downstream of the node (e.g., the network appliance 102) depends on whether the downstream device is an inline device or an out-of-band device. As noted above, inline devices receive the original data packets, while out-of-band devices receive copies of the original data packets.

Here, the network appliance 102 can receive data packets from node 106b (e.g., via transmission path 114a) and pass at least some of the data packets to node 106c (e.g., via transmission path 114b). Because node 106b is able to transmit network traffic downstream through the network appliance 102, node 106b need not be coupled directly to node 106c (i.e., transmission path 114c may not exist). Some or all of the nodes within the computer network 110 can be configured in a similar fashion.

When the network appliance 102 is deployed as an inline device, data packets are received by the network appliance 102 at a network port (also referred to as an "ingress port"). For example, data packets transmitted by node 106b via transmission path 114a are received by the network appliance 102 at a particular ingress port. The network appliance 102 may include multiple ingress ports that are coupled to different nodes in the computer network 110. In some embodiments, the network appliance 102 is a physical monitoring platform that includes a chassis and interchangeable blades offering various functionalities, such as enhanced packet distribution and masking/filtering capabilities. In other embodiments, the network appliance 102 is a virtual monitoring platform that hosted on a cloud computing platform or an on-premises computing environment managed by an enterprise.

The network appliance 102 can also transmit data packets from a network port (also referred to as an "egress port"). For example, the network appliance 102 may include multiple egress ports that are coupled to different network tools 112a-n. Each network tool 112a-n can be deployed as an inline device or an out-of-band device at any given point in time. When a network tool is deployed as an out-of-band device, the network appliance 102 creates a duplicate copy of at least some of the data packets received by the network appliance 102, and then passes the duplicate copies to an egress port for transmission downstream to the out-of-band network tool. When a network tool is deployed as an inline device, the network appliance 102 passes at least some of the original data packets to an egress port for transmission downstream to the inline network tool, and those data packets are then normally received back from the tool at a separate network port of the network appliance 102 (i.e., assuming the data packets are not blocked by the tool).

Figure 1B:
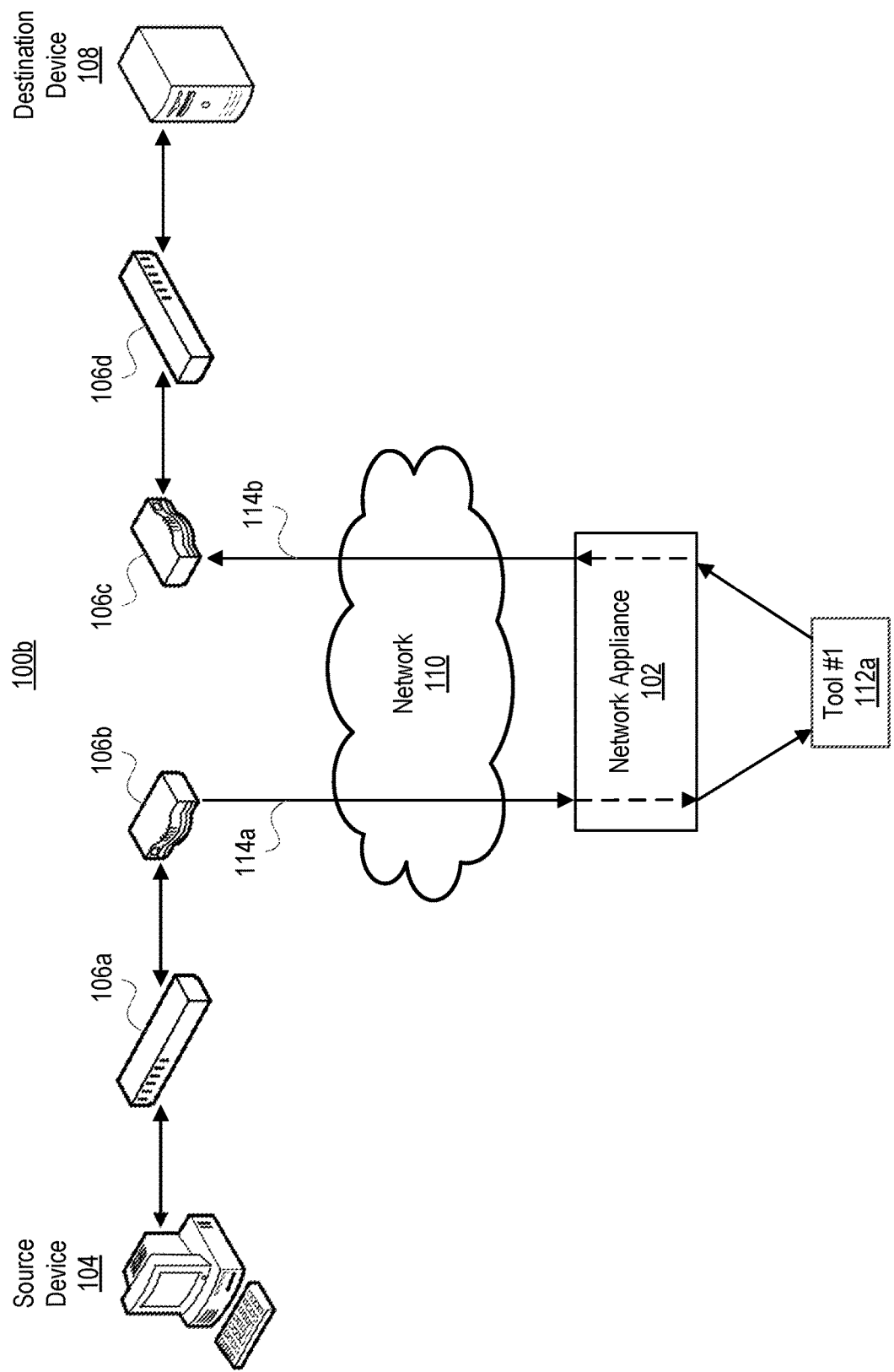
FIG. 1B illustrates an example path of a data packet as the data packet travels from a source device to a destination device.

FIG. 1B illustrates an example path of a data packet as the data packet travels from a source device 104 to a destination device 108. More specifically, FIG. 1B depicts a network arrangement 100b in which the network appliance 102 and a network tool 112a are both deployed as inline devices (i.e., within the flow of network traffic). Although the transmission paths 114a, 114b connecting the network appliance 102 and network tool 112a are half duplex wires (i.e., only transmit information in one direction), full duplex wires capable of transmitting information in both directions could also be used for some or all of the transmission paths between nodes of the computer network 110.

After receiving a data packet from node 106b, the network appliance 102 identifies a map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper map could be identified based on the network port of the network appliance 102 at which the data packet was received, the source node from which the data packet was received, etc.

The map represents a policy for how the data packet is to be handled by the network appliance 102. For example, the map could specify that the data packet is to be transmitted in a one-to-one configuration (i.e., from an ingress port of the network appliance 102 to an egress port of the network appliance 102), a one-to-many configuration (i.e., from an ingress port of the network appliance 102 to multiple egress ports of the network appliance 102), or a many-to-one configuration (i.e., from multiple ingress ports of the network appliance 102 to an egress port of the network appliance 102). Thus, a single egress port of the network appliance 102 could receive data packets from one or more ingress ports of the network appliance 102. Often, the data packet is passed (e.g., by a processor of the network appliance 102) to an egress port for transmission downstream to a network tool for further processing.

A map may specify that the data packet is to be passed by the network appliance 102 to a tool port for transmission downstream to the network tool 112a. The network appliance 102 may aggregate or modify the data packet in accordance with the policy specified by the map before passing the data packet to the egress port for transmission downstream to the network tool 112a. In some embodiments, the network appliance 102 includes multiple egress ports, each of which is coupled to a different network tool or another network appliance.

After analyzing the data packet, the network tool 112a normally transmits the data packet back to the network appliance 102 (i.e., assuming the network tool 112a does not determine that the data packet should be blocked), which passes the data packet to a network port for transmission downstream to another node (e.g., node 106c).

Figure 2:
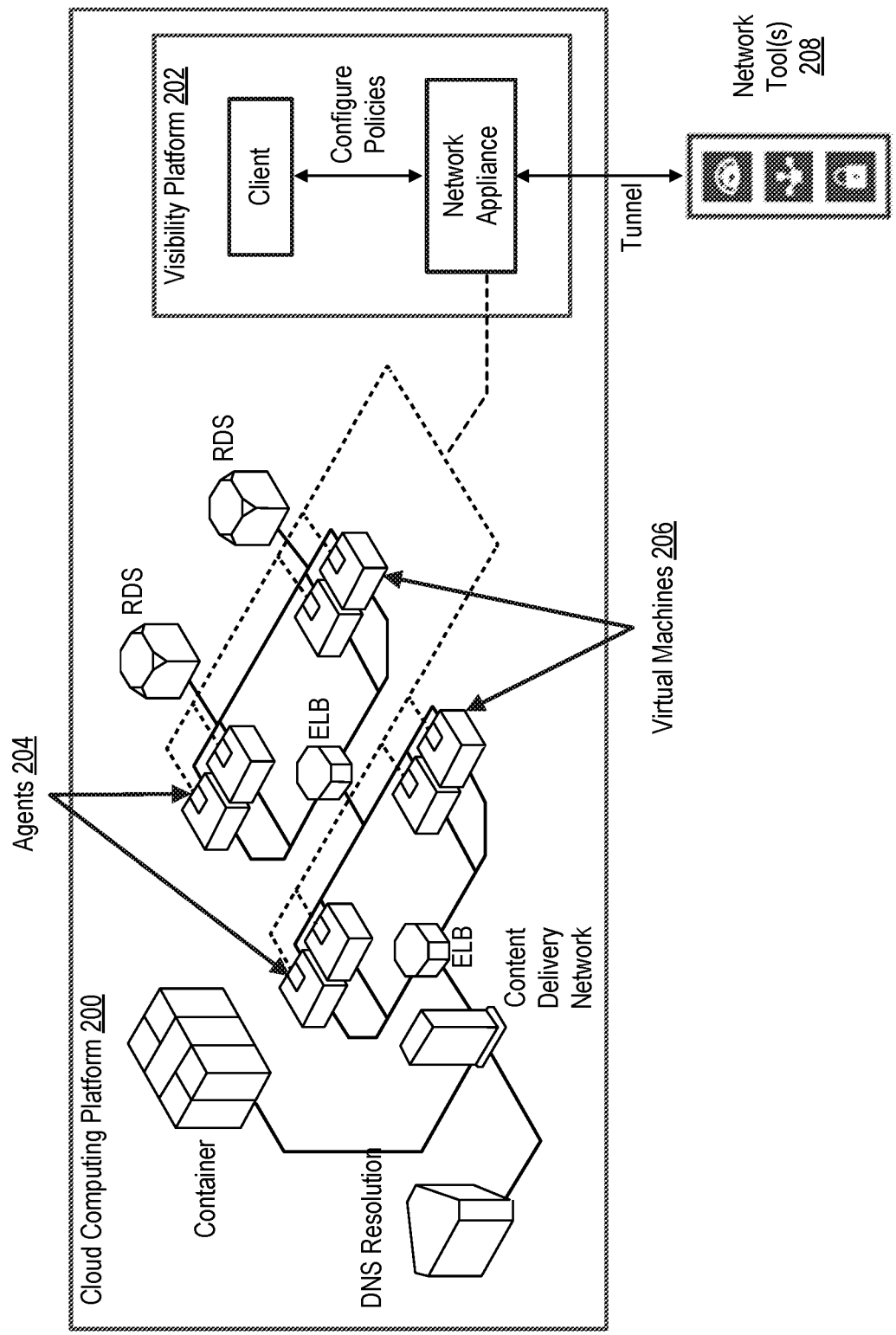
FIG. 2 depicts an example of how a visibility platform that includes a network appliance can be integrated into a cloud computing platform to provide a coherent view of virtualized traffic in motion across the public cloud infrastructure for an end user.

FIG. 2 depicts an example of how a visibility platform 202 that includes a network appliance can be integrated into a cloud computing platform 200 to provide a coherent view of virtualized traffic in motion across the public cloud infrastructure for an end user. Many end users (e.g., individuals and enterprises) have begun moving work processes and data to cloud computing platforms. By installing agents 204 on some or all of the virtual machines 206 belonging to the end user, the visibility platform 202 can acquire data packets (or duplicate copies of the data packets) traversing a public cloud infrastructure for further analysis in order to improve visibility into possible security risks.

In some embodiments, the visibility platform 202 is communicatively coupled to one or more network tools 208 for analyzing the virtualized traffic. The network tool(s) 208 can be hosted locally as part of the visibility platform 202 (i.e., on the cloud computing platform 200) or remotely (e.g., within an on-premises computing environment controlled by the end user). When the visibility platform 202 is entirely virtual (e.g., the network appliance is comprised of a virtual programmable switch), the visibility platform 202 establishes a tunnel for delivering the virtualized traffic to the network tool(s) 208 regardless of where the network tool(s) 208 reside. However, when the visibility platform 202 is physical (e.g., the network appliance is comprised of a physical programmable switch), the visibility platform 202 may establish a tunnel only for those network tool(s) 208 that are hosted remotely (e.g., are not directly coupled to the visibility platform 202 using physical cables).

A "tunnel" is a mechanism that can be used to reliably transmit traffic across a network. Before virtualized traffic is forwarded to the tunnel by the visibility platform 202 for transmission to the network tool(s) 208, the visibility platform 202 may create an outer jacket for the virtualized traffic (and any other network content) based on the type of tunnel. For example, an inner payload could be wrapped in an encapsulation by the visibility platform 202 in accordance with a Virtual Extensible LAN (VXLAN) protocol or a Generic Routing Encapsulation (GRE) protocol. The network tool(s) 208 can then remove the outer jacket upon reception and determine how the inner payload (i.e., the actual virtualized traffic) should be handled.

The visibility platform 202 can exist as a cloud-native virtual machine (also referred to as an "unnative virtual machine") that analyzes virtualized traffic traversing the cloud computing platform 200. Accordingly, the visibility platform 202 may not be limited by the computer hardware responsible for supporting the cloud computing platform 200.

Figure 3:
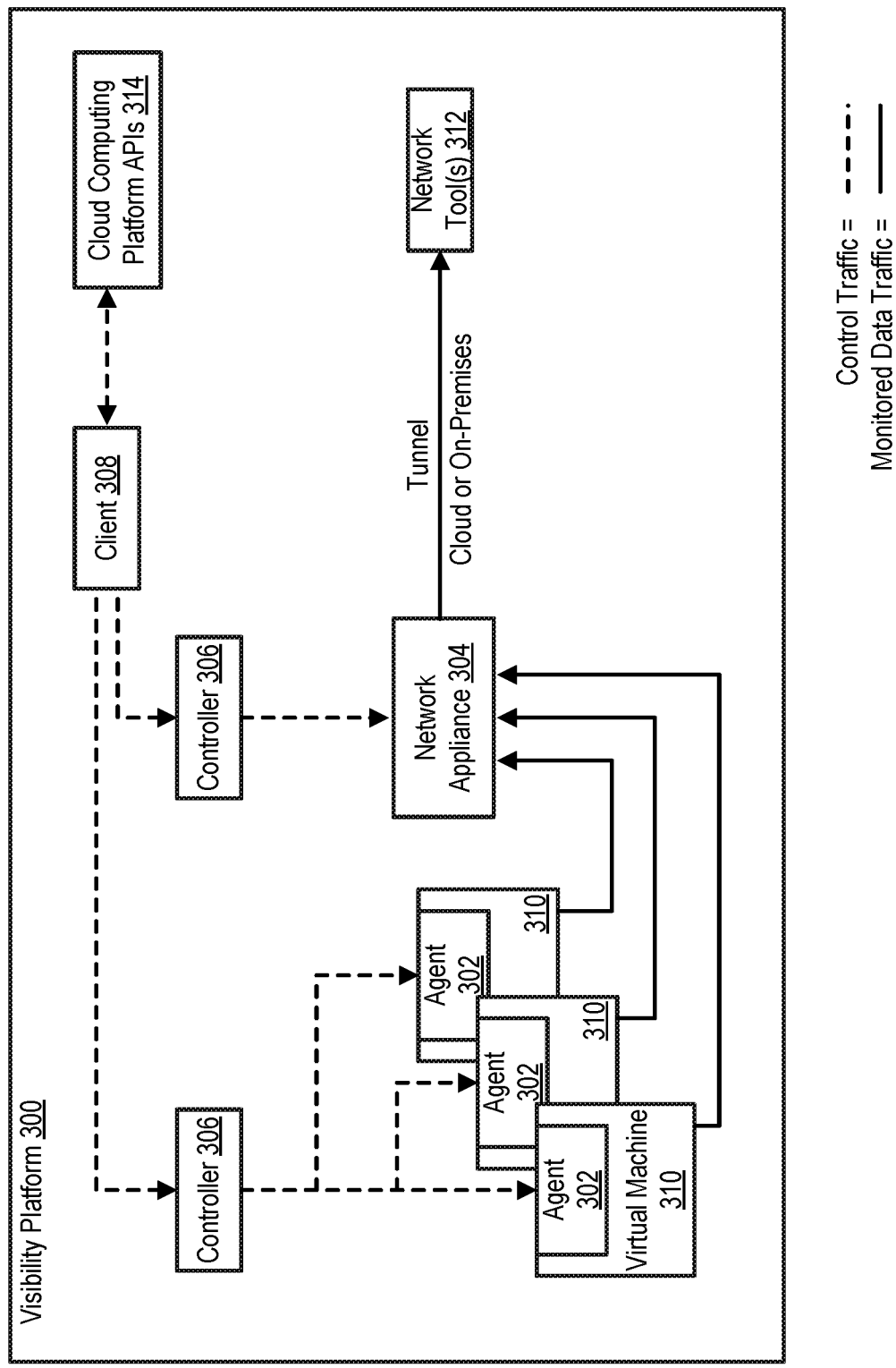
FIG. 3 depicts one embodiment of a visibility platform that can be run entirely within a cloud environment or a non-cloud environment (e.g., as a virtual machine).

FIG. 3 depicts one embodiment of a visibility platform 300 that can be run entirely within a cloud environment or a non-cloud environment (e.g., as a virtual machine). Thus, the visibility platform 300 may be hosted on a cloud computing platform, run on a dedicated piece of computer hardware (e.g., a monitoring platform that includes a chassis and interchangeable blades offering various functionalities), or some combination thereof. For example, the visibility platform 300 could include a network appliance 304 that resides on a stand-alone personal computer, a dedicated network server, or some other computing device having an x86 instruction set architecture.

In some instances, it may be desirable to run the network appliance 304 as a virtual machine on a cloud computing platform (e.g., cloud computing platform 200 of FIG. 2). For example, the visibility platform 300 may exist inside of a Virtual Private Cloud (VPC) that resides within a dedicated section of an end user's virtual network within Amazon Web Services (AWS), VMware, OpenStack, etc. Such an arrangement permits the visibility platform 300 to intelligently optimize, filter, and analyze virtualized traffic across hundreds or thousands of virtual machines. Note, however, that the visibility platform 300 may also exist outside of the VPC.

The visibility platform 300 can include one or more agents 302 for mirroring virtualized traffic traversing a cloud computing platform, a network appliance 304 for aggregating, filtering, and processing the virtualized traffic, one or more controllers 306, and a client 308 for managing the visibility platform 300 as a whole. Other embodiments may include a subset of these components.

As shown here, each agent 302 is fully contained within a corresponding target virtual machine 310 whose virtualized traffic is to be monitored. The term "virtualized traffic" generally refers to traffic that is handled (e.g., generated or received) by a virtual machine. While the agent(s) 302 serve requests issued by the controller(s) 306, each agent 302 may be responsible for configuring its own interface mirrors, tunnels, etc.

The network appliance 304 can include a programmable switch (also referred to as a "switching engine"). The programmable switch may be a physical switch or a virtual switch, such as a software-defined networking (SDN) switch. The network appliance 304 is responsible for aggregating virtualized traffic mirrored by the agent(s) 302. The network appliance 304 may forward the aggregated virtualized traffic to, for example, an application or network tool for further analysis. Here, for example, the network appliance 304 is configured to forward at least some of the aggregated virtualized traffic to one or more network tools 312 for further analysis. In some embodiments, the network visibility appliance 304 examines, filters (e.g., slices, masks, or samples), and/or replicates the aggregated virtualized traffic before forwarding it downstream to the network tool(s) 312.

The controller(s) 306, meanwhile, may be controlled by the end user via the client 308, which may be hosted on the cloud computing platform on in an on-premises computing environment controlled by the end user. In some embodiments a single controller 306 is configured to control the agent(s) 302 and the network appliance 304, while in other embodiments multiple controllers 306 are configured to control the agent(s) 302 and the network appliance 304. Here, for example, a first controller controls the agent(s) 302 and a second controller controls the network appliance 304. However, each agent 302 could also be associated with a dedicated controller.

Together, the client 308 and the controller(s) 306 enable centralized management of the visibility platform 300 as a whole. For example, the client 308 may be configured to integrate with one or more application programming interfaces (APIs) 314 offered by the cloud computing platform in order to retrieve relevant information about the virtualized traffic being monitored (e.g., end user credentials, virtual machine addresses, virtualized traffic characteristics). In some embodiments, the client 308 supports a drag-and-drop user interface that can be used by the end user to create and implement traffic policies. Moreover, the client 308 may provide traffic policy statistics to the end user or an administrator (e.g., the manager of the visibility platform 300) for troubleshooting in real time.

By identifying the network object(s) interconnected through a visibility fabric, a traffic flow can be readily monitored regardless of whether the network appliance 304 is monitoring data packets traversing a physical device or a virtual environment. Examples of network objects include raw endpoints, tunnel endpoints, application endpoints, and maps. A network appliance may include one or more raw endpoints that receive traffic directly from corresponding Network Interface Cards (NICs) or virtual Network Interface Cards (vNICs). The network appliance may also include one or more tunnel endpoints that send/receive traffic to/from remote locations. Examples of remote locations include other network visibility appliances, on-premises computing environments, etc. Tunnel endpoints can be created by the network appliance using APIs, and tunnel endpoints are typically associated with both a remote endpoint and a specific type (e.g., VXLAN or GRE).

As further described below, the network visibility appliance may also include one or more application endpoints that send/receive data packets to/from application programs (or simply "applications"). Applications may be responsible for creating, aggregating, filtering, and/or modifying the traffic received by the network appliance. Examples of applications can include masking programs, deep packet inspection programs, net flow generation programs, deduplication programs, etc.

The network appliance can receive traffic at raw endpoints, tunnel endpoints, and application endpoints, and the network appliance can output traffic at tunnel endpoints and application endpoints. Raw endpoints, therefore, can only receive incoming traffic, while tunnel endpoints and application endpoints are generally bi-directional (i.e., can receive and transmit traffic across different ingress and egress interfaces).

Raw endpoints can receive traffic directly from (v)NICs. However, tunnel endpoints are often the predominant way to route traffic away from a network appliance (e.g., into an on-premises environment that includes one or more network tools). Moreover, although application endpoints route traffic into an environment managed by an application, the environment still typically resides within the network visibility appliance.

Elastic Modification of Application Instances

Network appliances have traditionally included application(s) configured to provide data packet manipulation services. For example, an application may be configured to manipulate the content of a data packet, examine the content of a data packet, etc. Thus, an application may be responsible for creating, aggregating, filtering, examining, and/or modifying the traffic received by a network appliance.

However, applications suffer from several drawbacks. For example, while traffic throughput has consistently increased (e.g., due to improvements in network infrastructure), each application deployed on a network appliance is associated with a static capacity limitation that restricts how much traffic can be handled at once.

Figure 4:
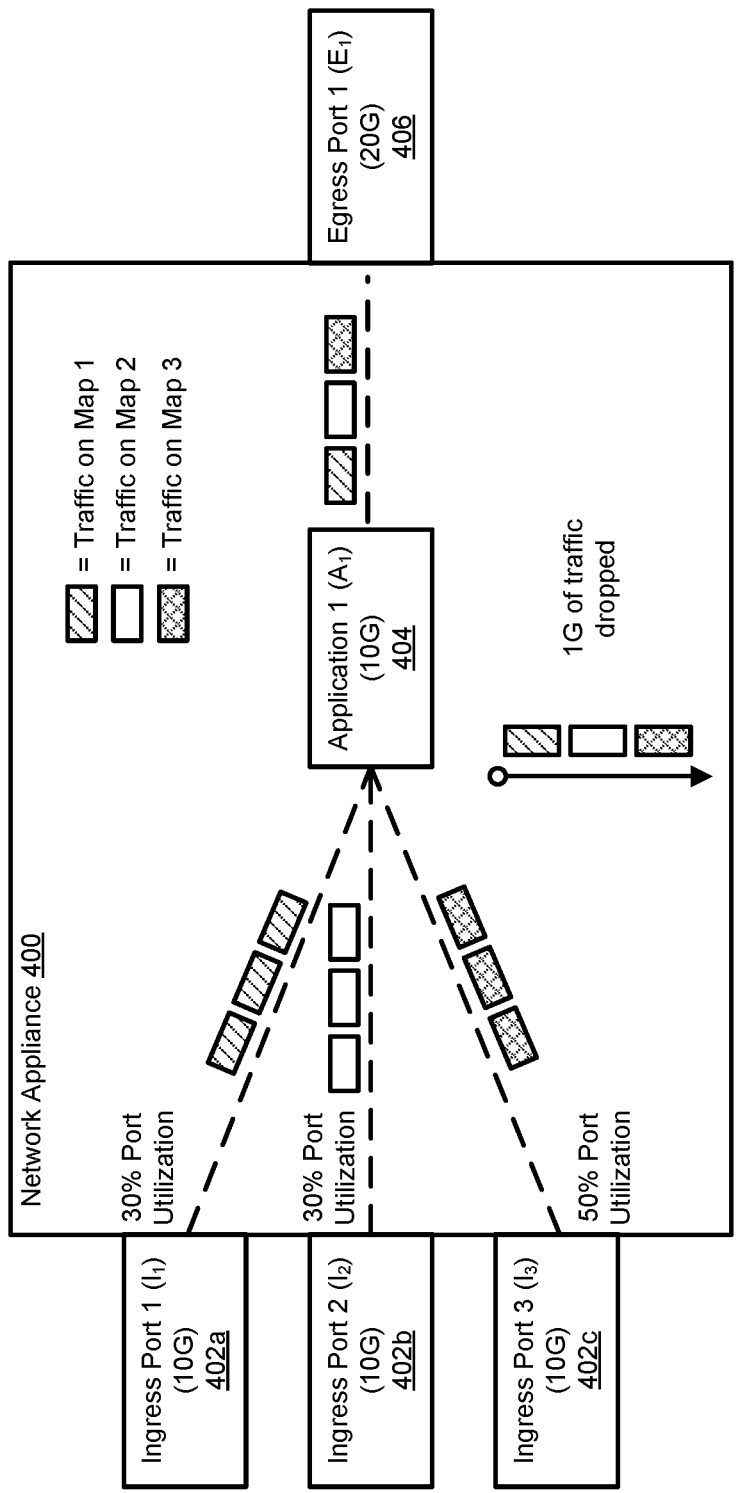
FIG. 4 illustrates how a conventional network appliance will often indiscriminately drop data packets during periods of high congestion.

FIG. 4 illustrates how a conventional network appliance 400 will often indiscriminately drop data packets during periods of high congestion. The network appliance 400 can include one or more ingress ports 402a-c through which data packets are received. Here, for example, the network appliance 400 includes three ingress ports 402a-c (i.e., Ingress Port 1 ($I_1$) 402a, Ingress Port 2 ($I_2$) 402b, and Ingress Port 3 ($I_3$) 402c) that are configured to forward data packets to an application 404 for processing. However, some embodiments of the network appliance 400 may only include a single ingress port.

After receiving data packets at the ingress ports 402a-c, the network appliance 402 may identify a flow map for the data packets received at each ingress port. The flow maps may specify that the data packets received at multiple ingress ports should be forwarded to an application to processing, and then to an egress port for transmission downstream. Here, for example, a first flow map specifies that the data packets received at Ingress Port 1 ($I_1$) 402a should be forwarded to Application 1 ($A_1$) 404 and then onward to Egress Port 1 ($E_1$) 406, a second flow map specifies that the data packets received at Ingress Port 2 ($I_2$) 402b should be forwarded to Application 1 ($A_1$) 404 and then onward to Egress Port 1 ($E_1$) 406, and a third flow map specifies that the data packets received at Ingress Port 3 ($I_3$) 402c should be forwarded to Application 1 ($A_1$) 404 and then onward to Egress Port 1 ($E_1$) 406.

Each of the ingress ports 402a-c is associated with a capacity limitation (also referred to as a "throughput limitation" or "bandwidth limitation"). Here, for example, each of the ingress ports 402a-c has an identical capacity limitation of 10 gigabits. Note, however, that each of the ingress ports 402a-c could be associated with a different capacity limitation.

When traffic flow through the ingress ports 402a-c is low, all of the data packets can be forwarded to the application 404 without issue. That is, when utilization of the ingress ports 402a-c is collectively less than the capacity limitation of the application 404 (i.e., $I_1+I_2+I_3 \leq 100\%$ $A_1$ Capacity), no data packets are dropped by the network appliance 400. However, such a configuration will cause the application 404 to become overloaded during periods of high congestion. For example, utilization of the ingress ports 402a-c may occasionally exceed the capacity of the application. In such a scenario, the network appliance 400 will drop some of the data packets corresponding to each flow map indiscriminately simply because the application 404 cannot handle all of the traffic. Generally, all of the flow maps that cause data packets to be forwarded to the congested application will experience dropping of data packets, and the drop is typically consistent across all of the flow maps. But this can cause significant disruptions in the flow of traffic, particularly when the network appliance 400 is deployed as an inline device.

To increase the processing capacity, a network administrator can:
  Manually update the existing application to a newer version having a higher capacity limitation; or
  Manually replace the existing application with a different application having a higher capacity limitation.

These choices can be costly and, in some instances, may be difficult to implement. This issue becomes an even larger problem in the context of virtualized traffic. To monitor the virtualized traffic associated with an end user, a network appliance may need to receive traffic from hundreds or thousands of virtual machines. Yet a single instance of an application often cannot handle the volume of traffic under consideration.

Introduced here, therefore, are visibility platforms whose total processing capacity can be dynamically varied in response to determining how much traffic is currently under consideration. A visibility platform can include one or more network appliances, each of which includes at least one instance of an application configured to process data packets. Rather than forward all traffic to a single application instance for processing, the traffic can instead be distributed amongst a pool of application instances to collectively ensure that no data packets are dropped due to over-congestion.

As further described below, the visibility platform can be designed such that application instances are elastically added/removed, as necessary, based on the volume of traffic currently under consideration. For example, responsive to a determination that the amount of traffic under consideration exceeds an upper processing capacity threshold of the existing application instance(s), a new application instance may be added. The upper processing capacity threshold may correspond to the processing capacity of all application instances currently in existence. As another example, responsive to a determination that the amount of traffic under consideration falls below a lower processing capacity threshold of the existing application instance(s), an existing application instance may be removed. The lower processing capacity threshold may correspond to the processing capacity of all application instances currently in existence minus one.

Figure 5A:
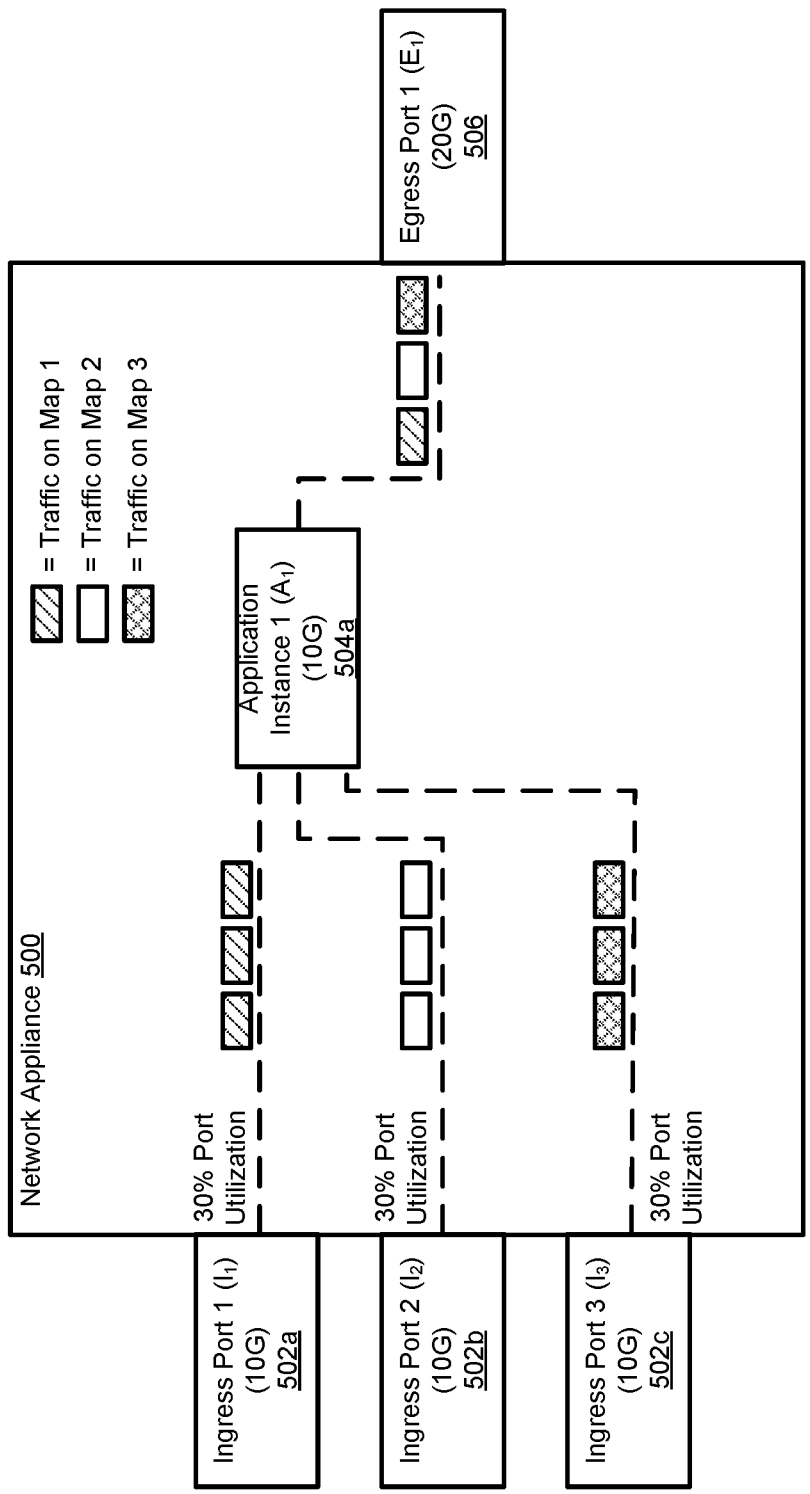
FIG. 5A illustrates a first scenario in which a single application instance can handle all traffic being forwarded to it by the network appliance.
Figure 5B:
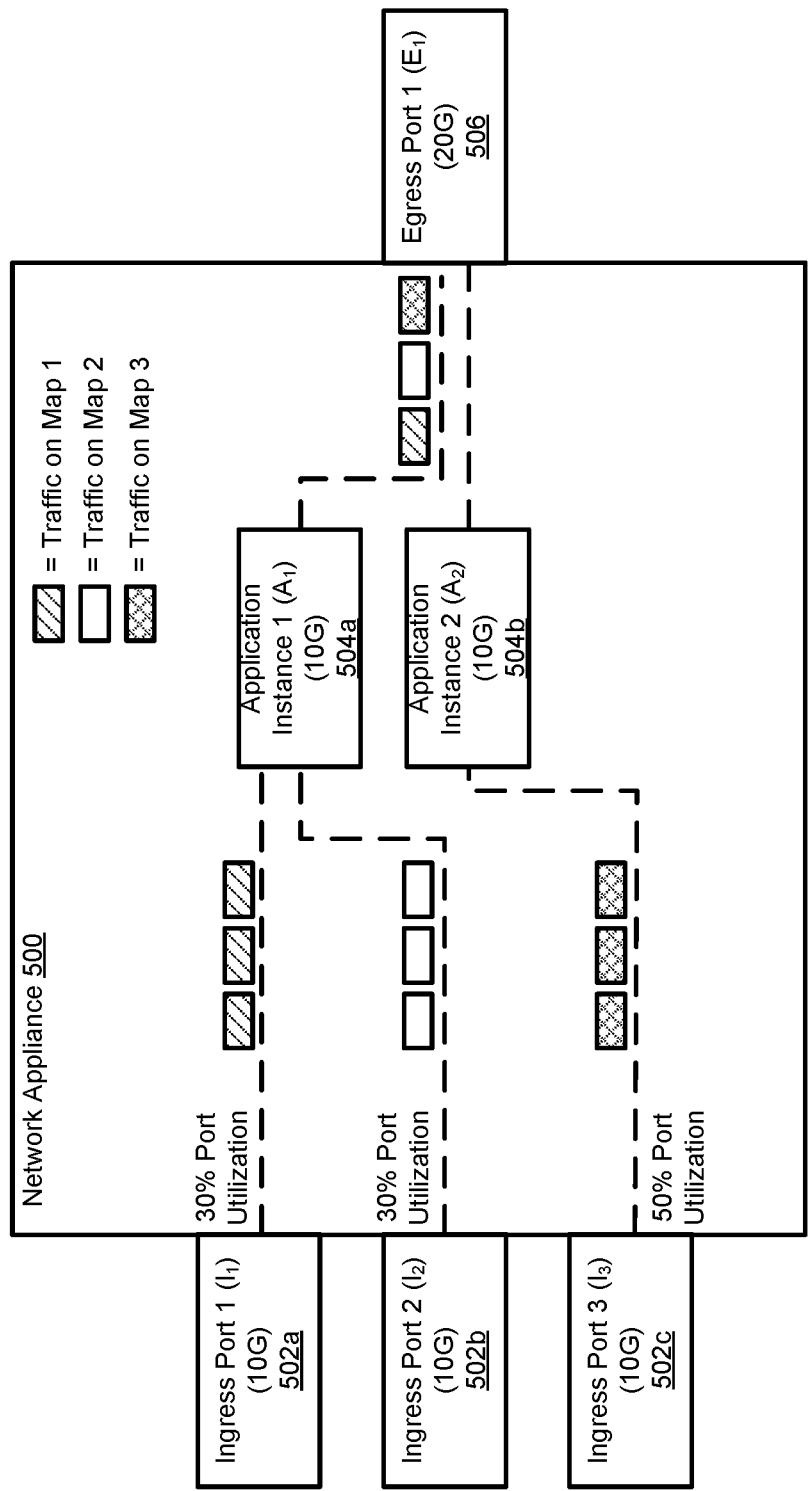
FIG. 5B illustrates a second scenario in which two application instances are needed to handle all traffic being forwarded by the network appliance.
Figure 5C:
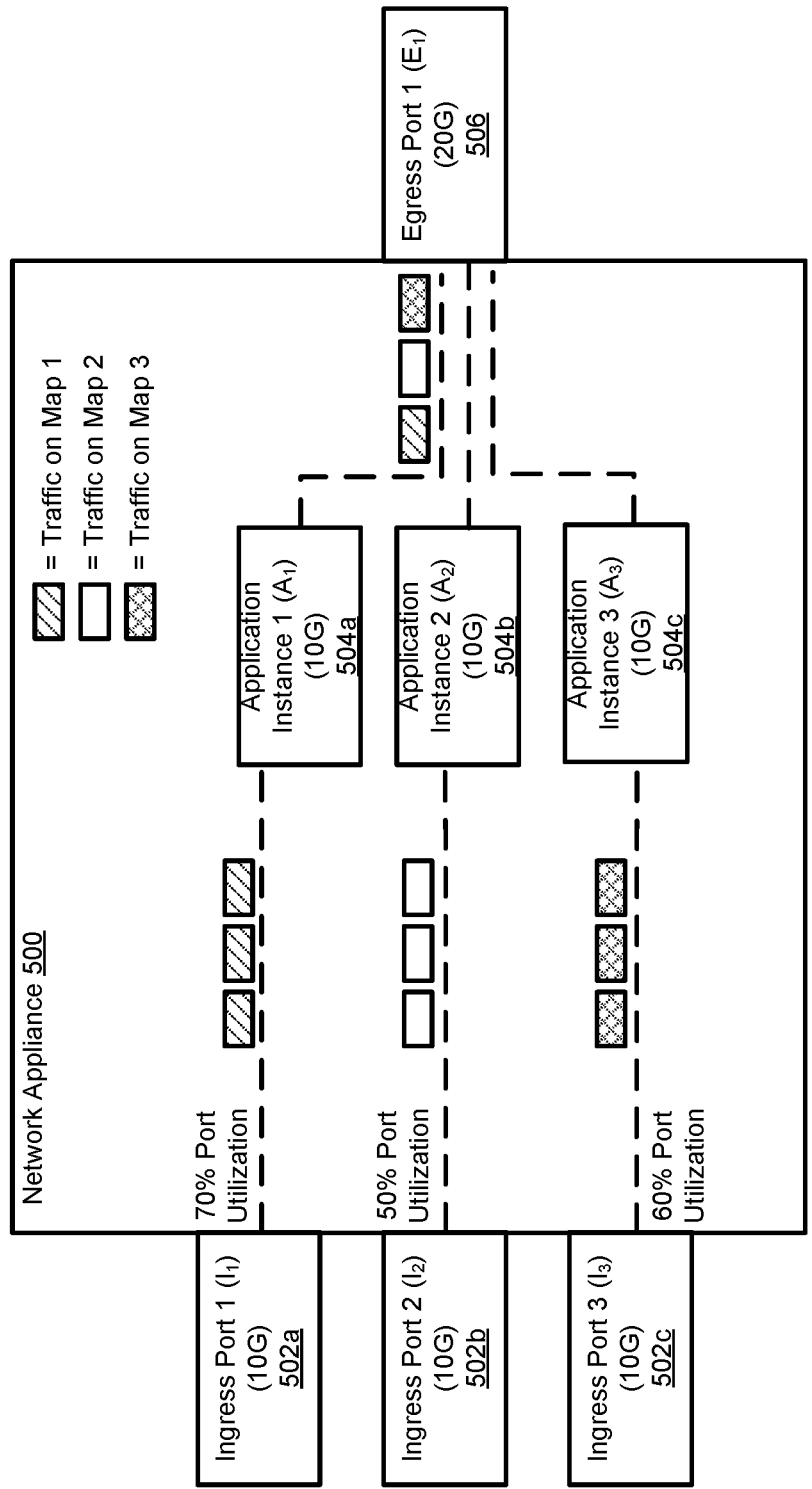
FIG. 5C illustrates a third scenario in which three application instances are needed to handle all traffic being forwarded by the network appliance.

FIGS. 5A-C illustrate how the technology described herein enables the number of application instances to be elastically varied to ensure that an appropriate amount of processing capacity is available. When traffic is received by a network appliance 500 at one or more ingress ports 502a-c, the network appliance 500 can identify the flow map(s) that will govern how the traffic is to be handled by the network appliance 500. Here, for example, a first flow map specifies that the data packets received at Ingress Port 1 ($I_1$) 502a should be forwarded to Application Instance 1 ($A_1$) 504a and then onward to Egress Port 1 ($E_1$) 506, a second flow map specifies that the data packets received at Ingress Port 2 ($I_2$) 502b should be forwarded to Application Instance 1 ($A_1$) 504a and then onward to Egress Port 1 ($E_1$) 506, and a third flow map specifies that the data packets received at Ingress Port 3 ($I_3$) 502c should be forwarded to Application Instance 1 ($A_1$) 504 and then onward to Egress Port 1 ($E_1$) 506. The composite stream of traffic comprised of any data packets that survive processing by Application Instance 1 ($A_1$) 504a can be forwarded downstream to a network tool, another network appliance, a node in a computer network, etc.

While applications can be designed to offer sophisticated functionalities, they are also resource intensive and, consequently, have limited processing capacity. During periods of high traffic volume, an application may become overwhelmed. Data packets may be inadvertently dropped as a result. However, these data packets may include valuable information that is useful in better understanding content of the traffic, threats to a computer network, etc.

To avoid inadvertent dropping of data packets, the network appliance 500 can dynamically vary the number of application instances responsible for processing incoming traffic. In some embodiments, the network appliance 500 employs a flow meter to detect the number of data packets that are destined for an application instance. Here, for example, the network appliance 500 may cause the data packets received at each of the ingress ports 502a-c to be examined by a flow meter (not shown) by the application instance 504a. The network appliance 500 may implement flow meters on a per-flow map basis. Consequently, the network appliance 500 may include multiple flow meters (e.g., a separate flow meter corresponding to each application instance).

The flow meter may be programmed with one or more threshold rates that are used to determine the appropriate action to be taken for the data packets. For example, the flow meter may include a first filter programmed with an upper threshold rate and/or a second filter programmed with a lower threshold rate. The upper and lower threshold rates are generally defined in terms of gigabits per second (G/s) or data packets per second (packet/sec). In some embodiments, the flow meter enables an administrator to set a specified capacity profile for an application that prevents each instance from receiving more traffic than it can handle. In other embodiments, the flow meter automatically configures the capacity profile for the application based on a characteristic of the application. For example, the capacity profile may limit each instance to utilizing a predetermined percentage of the total available capacity.

FIG. 5A illustrates a first scenario in which a single application instance can handle all traffic being forwarded to it by the network appliance 500. Here, each of the ingress ports 502a-c is experiencing 30% port utilization. In such a scenario, Application Instance 1 ($A_1$) 504a will receive 3G of traffic from Ingress Port 1 ($I_1$) 502a, 3G of traffic from Ingress Port 2 ($I_2$) 502b, and 3G of traffic from Ingress Port 3 ($I_3$) 502c. Because the total amount of traffic received by Application Instance 1 ($A_1$) 504a falls below its capacity threshold (i.e., 3G+3G+3G<10G), no data packets will be dropped. A single application instance can handle all of the traffic without issue in such a scenario.

However, the volume of traffic received at the ingress ports 502a-c will occasionally exceed the capacity threshold of the application instance 504a. FIG. 5B illustrates a second scenario in which two application instances are needed to handle all traffic being forwarded by the network appliance 500. As shown in FIG. 5B, Ingress Port 3 ($I_3$) 502c is now experiencing 50% port utilization, while Ingress Port 1 ($I_1$) 502a and Ingress Port 2 ($I_2$) 502b are still experiencing 30% port utilization. Conventionally, all traffic received at the ingress ports 502a-c would be forwarded to Application Instance 1 ($A_1$) 504a, and some data packets would be inadvertently dropped because the total amount of traffic received by Application Instance 1 ($A_1$) 504a exceeds its capacity threshold (i.e., 3G+3G+5G>10G). Here, however, the network appliance 500 instantiates a second application instance (i.e., Application Instance 2 ($A_2$) 504b). Incoming data packets can then be cascaded amongst Application Instance 1 ($A_1$) 504a and Application Instance 2 ($A_2$) 504b.

FIG. 5C illustrates a third scenario in which three application instances are needed to handle all traffic being forwarded by the network appliance 500. As shown in FIG. 5C, Ingress Port 1 ($I_1$) 502a is now experiencing 70% port utilization, Ingress Port 2 ($I_2$) 502b is experiencing 50% port utilization, and Ingress Port 3 ($I_3$) 502c is now experiencing 60% port utilization. Because the total amount of traffic cannot be processed by Application Instance 1 ($A_1$) 504a and Application Instance 2 ($A_2$) 504b, the network appliance 500 has instantiated a third application instance (i.e., Application Instance 3 ($A_3$) 504c). Incoming data packets can then be cascaded amongst Application Instance 1 ($A_1$) 504a, Application Instance 2 ($A_2$) 504b, and Application Instance 3 ($A_3$) 504c.

Figure 6:
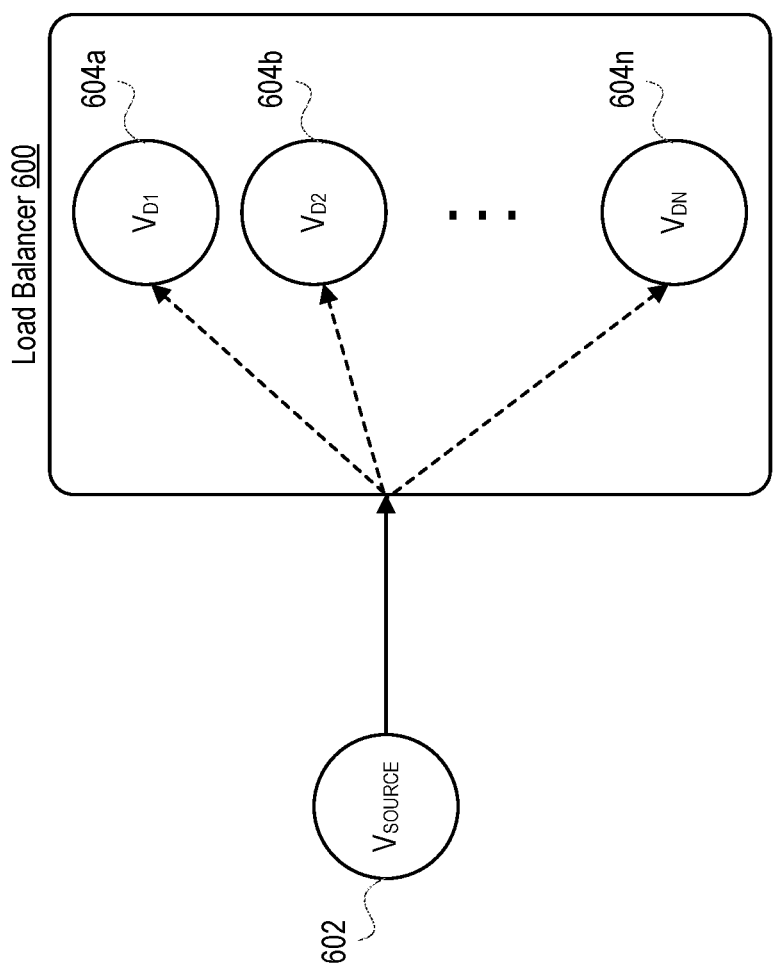
FIG. 6 depicts an example of a load balancer that is configured to distribute data packets received from a source node amongst multiple destination nodes in accordance with a load balancing strategy.

To distribute data packets amongst multiple instances of an application, a network appliance may employ a load balancer. FIG. 6 depicts an example of a load balancer 600 that is configured to distribute data packets received from a source node 602 amongst multiple destination nodes 604a-n in accordance with a load balancing strategy. The source node 602 may be an agent deployed on a virtual machine, a flow collector deployed outside of a virtual machine, a cloud computing platform, etc. The destination nodes 604a-n, meanwhile, may be separate instances of an application. In some embodiments these application instances reside on a single network appliance of a visibility platform, while in other embodiments these application instances reside on multiple network appliances of a visibility platform. The load balancer 600 can ensure that traffic received by a visibility platform is distributed amongst the multiple application instances in a roughly equivalent manner.

The load balancer 600 examines incoming traffic to determine which destination node of the multiple destination nodes 604a-n each data packet should be forwarded to. To properly balance the incoming traffic across the multiple destination nodes 604-a, the load balancing mechanism 600 can apply a transformation function that creates a value for each data packet and then identify the appropriate destination node for each data packet based on the corresponding value. One example of a transformation function is the highest random weight (HRW) hashing algorithm (also referred to as the "rendezvous hashing algorithm"). The HRW hashing algorithm is designed to achieve distributed agreement on a set of k options out of a possible set of n options.

When executed by the load balancer 600, the HRW hashing algorithm will assign each destination node ($V_{Dj}$) a weight for each data packet in the incoming traffic, and then forward each data packet to the destination node having the largest weight. Multiple load balancers can be used to ensure that duplicate copies of data packets are forwarded to the same destination node. Proper distribution, however, requires that each load balancer execute the same transformation function. For example, each load balancer involved in a distributed deduplication scheme may apply an identical hash function. When a transformation function is agreed upon by all load balancers in a visibility fabric, each load balancer can independently route traffic based on values computed using the transformation function. For example, each load balancer may independently compute weights using the HRW hashing algorithm and then pick whichever destination node corresponds to the largest weight. Accordingly, in a hierarchical arrangement of network appliances (each having a separate application instance), the network appliances in the same tier may execute the same load balancing strategy. Such action ensures that identical data packets received by different application instances in the same hierarchical tier will forward those data packets to the same application instance in a lower tier.

Figure 7:
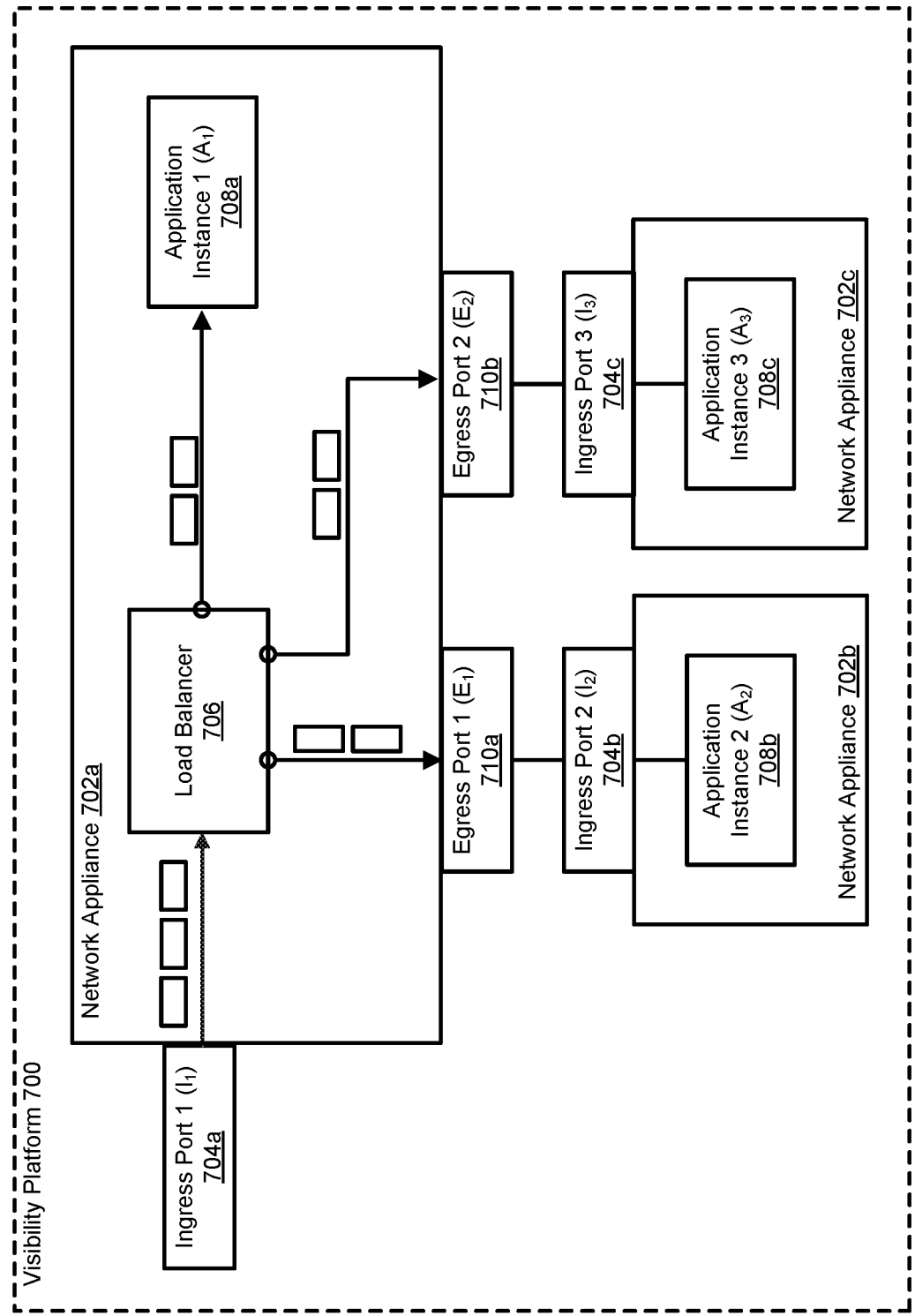
FIG. 7 depicts an example of a visibility platform that includes three network appliances, each of which includes a separate application instance designed to process data packets.

In FIGS. 5B-C, each application instance is shown to be internal to the network appliance. Said another way, each additional application instance instantiated by the network appliance resides on the network appliance itself. However, in some embodiments, at least some of the additional applications instances instantiated in a visibility fabric are external to the network appliance. FIG. 7 depicts an example of a visibility platform 700 that includes three network appliances 702a-c, each of which includes a separate application instance 708a-c designed to process data packets. Together, these application instances form a "pool" of applications instances to which the visibility platform can distribute traffic.

In such an arrangement, the network appliances 702a-c may need to pass data packets amongst one another via a tunnel connected between an egress port of one network appliance and an ingress port of another network appliance. Here, for example, traffic is initially received by network appliance 702a at Ingress Port 1 ($I_1$) 704a. The network appliance 702a can monitor the volume of incoming traffic to determine how many application instances are needed. For example, the network appliance 702a may determine (e.g., based on output from a flow meter) that multiple application instances are needed to process the traffic. Here, the network appliance 700a has determined that three application instances 708a-c are necessary to handle the traffic without inadvertently dropping data packets.

A load balancer 706 residing on the network appliance 702a may ensure that the traffic is properly distributed amongst the multiple application instances 708a-c. Application instances that reside on the network appliance 702a may receive data packets directly from the load balancer 706. Data packets to be forwarded to an application instance that resides outside the network appliance 702a, however, may be transmitted across a tunnel connected to the network appliance 702a. Here, for example, data packets to be processed by Application Instance 2 ($A_2$) 708b can be forwarded to Egress Port 1 ($E_1$) 710a of network appliance 702a. Egress Port 1 ($E_1$) 710a may be connected to Ingress Port 2 ($I_2$) 704b of network appliance 702b via a tunnel. As another example, data packets to be processed by Application Instance 3 ($A_3$) 708c can be forwarded to Egress Port 2 ($E_2$) 710b of network appliance 702a. Egress port 2 ($E_2$)

710b may be connected to Ingress Port 3 (I₃) 704c of network appliance 700c via another tunnel.

Figure 8:
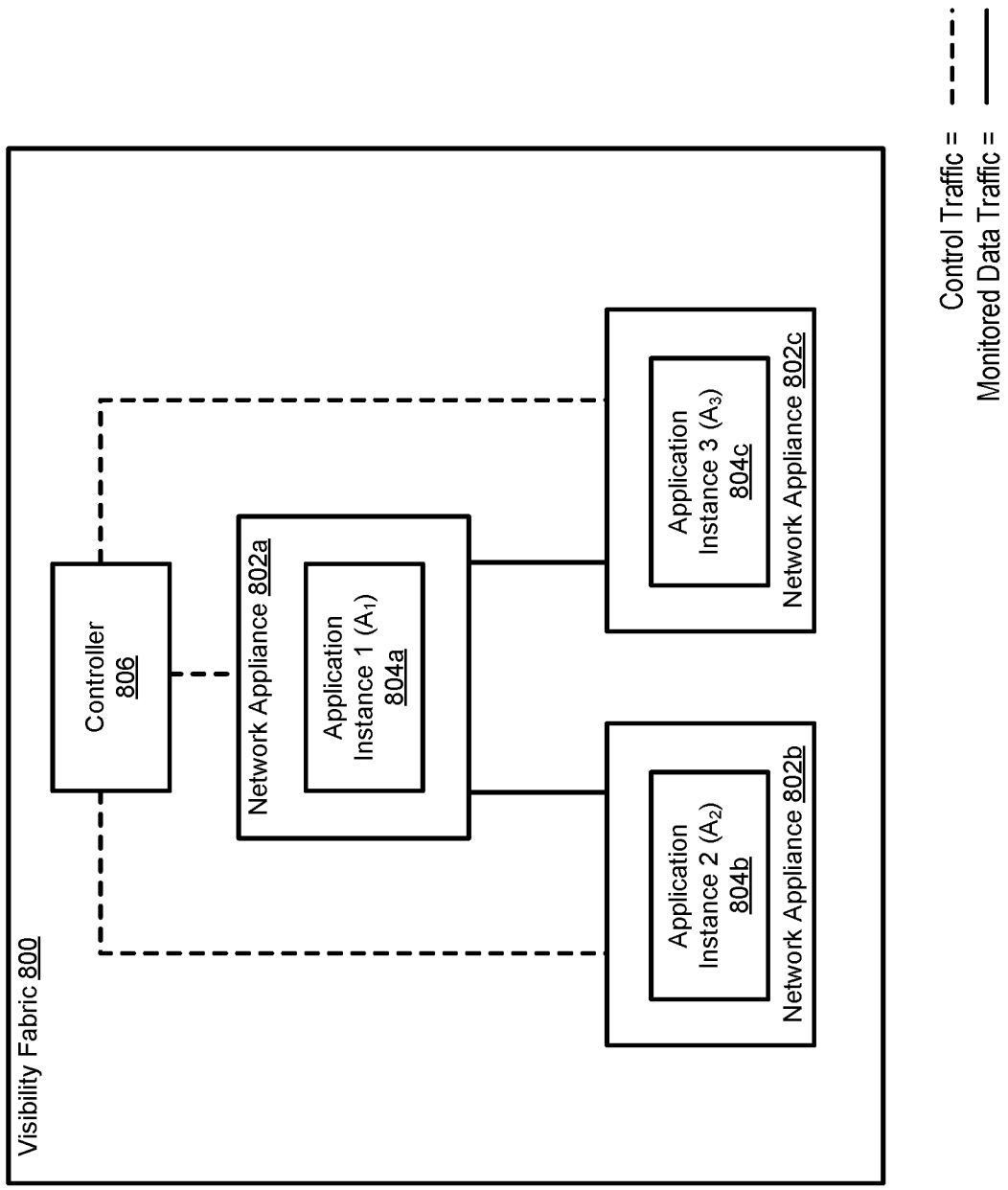
FIG. 8 depicts an example of a distributed visibility fabric that includes multiple network appliances, each of which executes a separate instance of an application.

FIG. 8 depicts an example of a distributed visibility fabric 800 that includes multiple network appliances 802a-c, each of which executes a separate instance 804a-c of an application. Some or all of the network appliances 802a-c may also include a load balancer (not shown).

A controller 806 may be responsible for elastically vary the number of application instances, as necessary, to accommodate the volume of traffic received by the visibility fabric 800. As noted above, rather than forward all traffic to a single application instance for processing, the traffic can instead be distributed amongst multiple application instances to collectively ensure that no data packets are inadvertently dropped due to over-congestion. Upon discovering that the volume of incoming traffic cannot be handled by the application instance(s) currently existing within the visibility fabric 800, the controller 806 can add a new application instance. Similarly, upon discovering that the volume of incoming traffic can be handled by a subset of the application instance(s) currently existing within the visibility fabric 800, the controller 806 can remove an existing application instance. Thus, the controller 806 may cause application instance(s) to be dynamically added and/or removed over time to account for variations in incoming traffic. Such action may be performed in real time as the volume of traffic changes over time.

In some embodiments, a single controller manages all of the network appliances (and thus all of the application instances) within the visibility fabric 800. In other embodiments, each network appliance within the visibility fabric 800 is managed by a separate controller.

Figure 9:
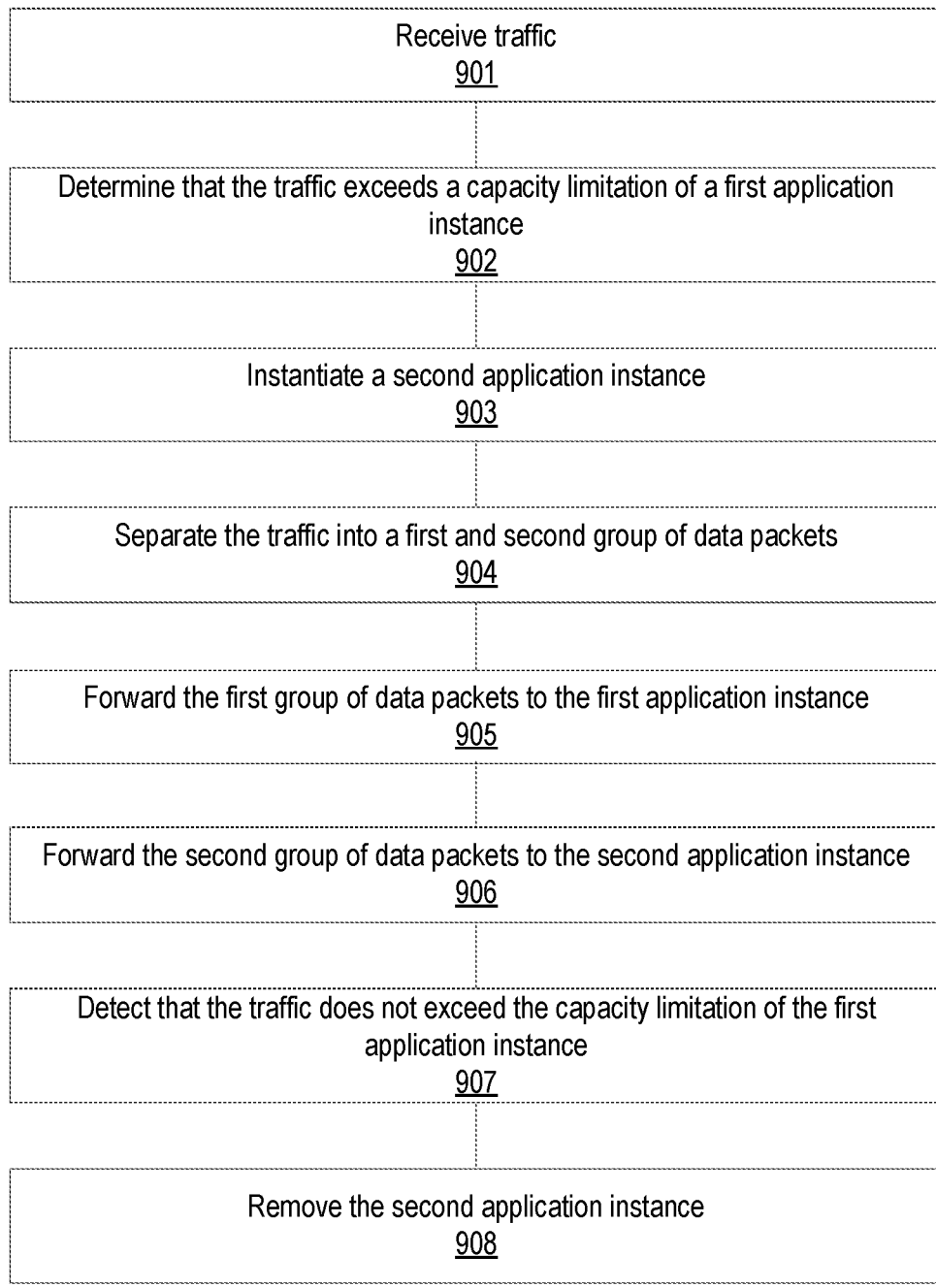
FIG. 9 depicts a process for elastically varying the processing capacity of a visibility platform by varying the number of application instances in existence.

FIG. 9 depicts a process 900 for elastically varying the processing capacity of a visibility platform by varying the number of application instances in existence. Initially, a visibility platform receives traffic (step 901). The traffic may include, for example, virtualized traffic associated with one or more virtual machines.

The visibility platform can then monitor the incoming traffic. For example, a controller may monitor the output of a flow meter to detect the volume of traffic received at ingress port(s) of a network appliance. In some instances, the visibility platform will determine that the traffic exceeds a capacity limitation of a first application instance to which the incoming traffic is to be routed for processing (step 902). To avoid dropping any data packets, the visibility platform can instantiate a second application instance (step 903). In some embodiments, the second application instance resides on the same network appliance as the first application instance. In other embodiments, the first and second application instances reside on separate network appliances that are communicatively coupled to one another.

The visibility platform can then distribute the incoming traffic amongst the first and second application instances. More specifically, a load balancer may separate the incoming traffic into multiple groups of data packets, for example, based on values generated through the application of a transformation function (step 904). For instance, the load balancer may create a first group that includes all data packets matching a first criterion (e.g., associated with a first flow map), a second group that includes all data packets matching a second criterion (e.g., associated with a second flow map), etc.

The visibility platform may cause the first group of data packets to be forwarded to the first application instance for processing (step 905). Moreover, the visibility platform may cause the second group of data packets to be forwarded to the second application instance for processing (step 906). Data packets that survive examination by the first and second application instances can be treated in several different ways. If the visibility platform is deployed as an inline traffic management solution, then the surviving data packets may be combined into a composite stream to be forwarded downstream (e.g., by the network appliance that includes the first application instance and/or the second application instance). Conversely, if the visibility platform is deployed as an out-of-band traffic management solution, then the surviving data packets may be collected for further analysis (i.e., since the surviving data packets do not need to be re-introduced into the computer network).

As noted above, the visibility platform can be configured to periodically or continually monitor the incoming traffic to determine whether a variation in the number of application instances is necessary. For instance, the visibility platform may detect that the incoming traffic no longer exceeds the capacity limitation of the first application instance (step 907). In such embodiments, the visibility platform can remove the second application instance (step 908). By dynamically modifying the number of application instances available at any given point in time, the visibility platform can ensure that an appropriate amount of processing capacity is available without allowing too much processing capacity to remain idle.

FIG. 10 depicts a process 1000 for modifying the number of application instances accessible to a visibility platform to dynamically account for variations in virtualized traffic volume. While steps of the process 1000 may be described as being performed by a network appliance, those skilled in the art will recognize that the steps could also be performed by a controller responsible for managing the network appliance(s) of the visibility platform.

Initially, a network appliance acquires virtualized traffic indicative of data packets traversing a virtual machine (step 1001). The virtual machine may be one of multiple virtual machines from which the network appliance acquires virtualized traffic. The network appliance can then compare the virtualized traffic to available processing capacity of an application configured to process the virtualized traffic (step 1002). Such action may be performed repeatedly (i.e., on a continual basis) to ensure that variations in virtualized traffic volume are discovered in real time. Each instance of the application typically has a fixed processing capacity limitation that limits how much virtualized traffic can be handled at one time. Accordingly, the available processing capacity may be based on the number of application instances currently in existence.

Based on a result of the comparison, the network appliance can modify the number of existing instances of the application to dynamically account for variations in virtualized traffic volume (step 1003). For example, responsive to a determination that the virtualized traffic cannot be handled by the existing application instance(s), a new application instance may be added. As another example, responsive to a determination that the virtualized traffic could be handled by fewer application instance(s), an existing application instance may be removed.

These steps may be performed in various sequences. For example, the network appliance may continually alternate between steps 1002 and 1003 to discover situations where the virtualized traffic cannot be handled by the existing application instance(s) in near real time, and then dynamically adjust the number of existing application instance(s) to reduce the number of data packets lost.

Graph-Based Visibility Fabric for a Visibility Platform

As noted above, a client (e.g., client 308 of FIG. 3) can be communicatively coupled to the network appliance(s) (e.g., network appliance 304 of FIG. 3) of a visibility platform. In some embodiments, the client supports a user interface (e.g., a drag-and-drop user interface) that enables an end user to modify the visibility fabric of the visibility platform.

A graph is a collection of nodes that are connected with edges (also referred to as "connections"). Here, the nodes represent separate network objects (e.g., raw endpoints, tunnel endpoints, application endpoints, or maps) and the connections illustrate how traffic flows between these network objects. In some embodiments, each traffic flow includes data packets output by a virtual machine that is communicatively coupled to the visibility platform.

Generally, the graph is modeled as a directed acyclic graph (DAG), which is a directed graph having no cycles. A DAG is formed from a topological sequence of nodes such that there is no path starting at a given node that eventually loops back to the given node. DAGs are preferred for representing visibility fabrics because loops are bad for networks (e.g., traffic may continually be pushed around while consuming bandwidth). Although the usefulness of individual graphical representations may be limited in some instances, network solutions can be more easily designed and built using the graphical representations described herein.

The nodes in a graph can represent several different kinds of network objects, including:
- Raw endpoints that receive traffic from (v)NICs;
- Tunnel endpoints that send/receive traffic to/from remote locations (e.g., those outside of the visibility platform);
- Maps representing packet filters that can be applied to the data packets that form the traffic; and
- Application endpoints that send/receive traffic to/from applications.

The connections depict how traffic flows amongst the nodes. The connections serve as links to connect the network objects in the desired manner. As noted above, the properties of the DAG prevent loops from being formed. Thus, each connection may be a directed edge that indicates traffic only flows in one direction.

Here, for example, traffic enters the network visibility appliance at two raw endpoints 1102a-b and a tunnel endpoint 1104. Raw endpoints are generally the first node(s) in the graph because they receive traffic directly from (v)NICs. Traffic received at the tunnel endpoint 1104 is routed directly to veth0 1106a (i.e., a virtual port). Traffic received at raw endpoint 1102a is routed to a map 1108, while traffic received at raw endpoint 1102b routed to both the tunnel endpoint 1104 and the map 1108.

Data packets can be replicated as necessary when leaving a network object corresponding to a node having multiple outgoing connections. For instance, data packets leaving the raw interface 1102b can be duplicated so that identical traffic streams are routed to the tunnel endpoint 1104 and the map 1108.

The map 1108 allows the visibility platform to select traffic of interest by matching against specified criteria defined in the map 1108. For example, traffic satisfying a first specified criterion can be routed to veth0 1106a, and traffic satisfying a second specified criterion can be routed to an application 1110, which forwards at least some of the traffic to veth1 1106b (i.e., another virtual port).

Accordingly, a visibility platform that includes a processor and an ingress interface (at which data packets are received) can identify a sequence of network objects through which a traffic flow received at the ingress interface should be routed, and then route the traffic flow through the sequence of network objects in accordance with a graph defining the visibility fabric of the visibility platform.

A single graph can be used to represent all of the active service chains within a visibility fabric (which may span a single visibility platform or multiple visibility platforms). Moreover, because the graph is constructed from nodes and connections, an end user (e.g., a network administrator) can readily use the connections as links to connect the network objects in any desired manner. Thus, the end user may use the graph to more easily manage traffic flowing across cloud architectures and/or non-cloud architectures. For example, the end user may review the graph on a user interface and modify the traffic route(s) by drawing connections between nodes, deleting existing connections, etc. The visibility fabric represented by the graph can be dynamically altered whenever nodes/connections are added, removed, or modified.

Figure 11:
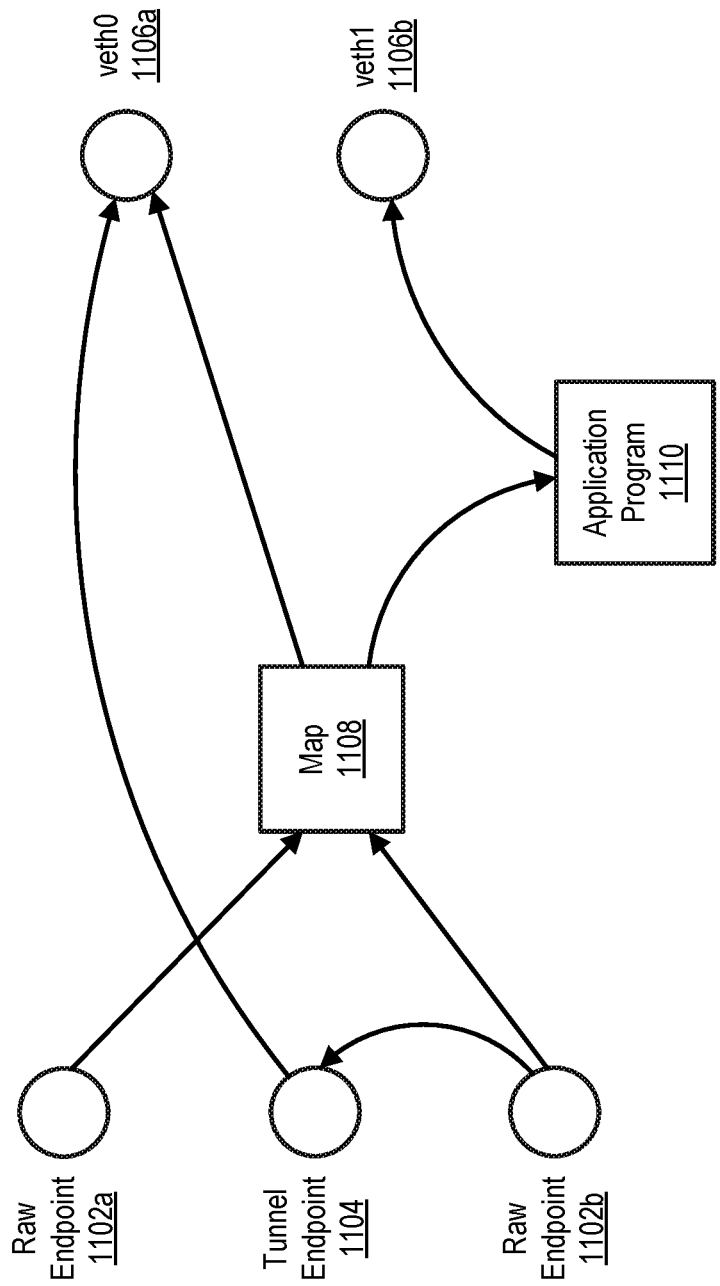
FIG. 11 depicts a graph that represents the network fabric of a visibility platform.

As shown in FIG. 11, the application 1110 can be shown in a simplified manner, even if the end user has acknowledged the number of instances of the application 1110 can be dynamically modified. Rather than include a series of visual components corresponding to the separate application instances, the graph may only include a single visual component for the application, regardless of how much instances currently exist. Note, however, the user interface may permit the end user to specify whether the visibility platform is permitted to automatically vary the number of application instances without requiring explicit input from the end user. That is, the user interface may allow the end user to specify whether such a functionality should be enabled or disabled.

To produce the graph should in FIG. 11, the client can initially construct a DAG to visually represent a visibility fabric of a visibility platform. More specifically, the client can create a node in the DAG for each network object associated with the visibility platform, as well as create a connection between a pair of nodes in the DAG for each traffic flow between a pair of network objects. Thereafter, the client may receive input indicative of a request to insert an application within the visibility fabric. Responsive to receiving the input, the client can cause display of the DAG on a computing device accessible to the end user. The application may be represented with a single visual component, and the appearance of the single visual component may remain unchanged though the number of instances of the application may be elastically modified to account for variations in traffic acquired by the visibility platform.

Processing System

Figure 12:
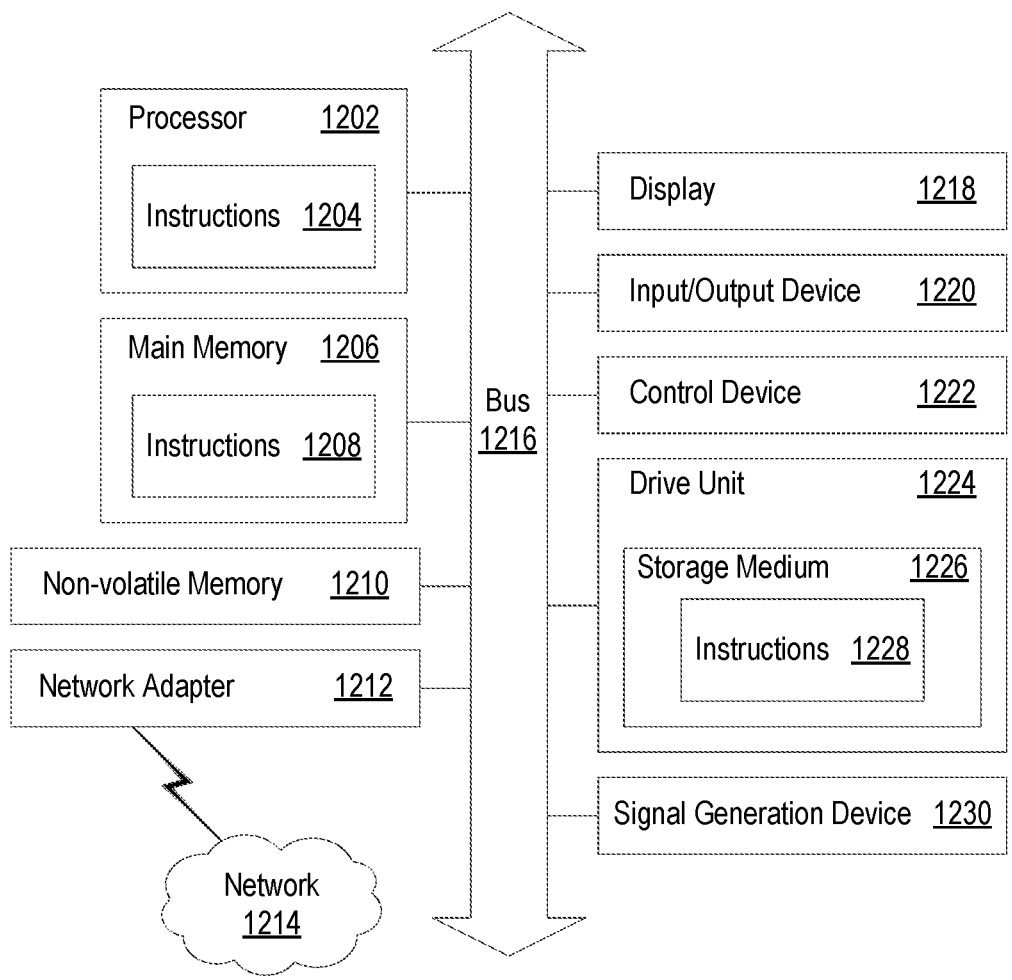
FIG. 12 includes a block diagram illustrating an example of a processing system in which at least some operations described herein can be implemented.

FIG. 12 includes a block diagram illustrating an example of a processing system 1200 in which at least some operations described herein can be implemented. For example, the processing system 1200 may be responsible for generating an interface through which an end user manages multiple network visibility appliances of a visibility platform. As another example, at least a portion of the processing system 1200 may be included in a computing device (e.g., a server) that supports a network appliance and/or a cloud computing platform. The process system 1200 may include one or more processors 1202, main memory 1206, non-volatile memory 1210, network adapter 1212 (e.g., network interfaces), display 1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents any one or more separate physical buses, point to point connections, or both connected by appropriate bridges, adapters, or controllers. The bus 1216, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 1200 operates as a standalone device, although the processing system 1200 may be connected (e.g., wired or wirelessly) to other devices. For example, the processing system 1200 may include a terminal that is coupled directly to a network appliance. As another example, the processing system 1200 may be wirelessly coupled to the network appliance.

In various embodiments, the processing system 1200 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 1200.

While the main memory 1206, non-volatile memory 1210, and storage medium 1226 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1228. The term "machine-readable medium" and "storage medium" shall also be taken to include any medium that is capable of storing, encoding, or carrying a set of instructions for execution by the processing system 1200 and that cause the processing system 1200 to perform any one or more of the methodologies of the presently disclosed embodiments.

In general, the routines that are executed to implement the technology may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in a computer, and that, when read and executed by one or more processing units or processors 1202, cause the processing system 1200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1210, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1212 enables the processing system 1200 to mediate data in a network 1214 with an entity that is external to the processing system 1200, such as a network appliance, through any known and/or convenient communications protocol supported by the processing system 1200 and the external entity. The network adapter 1212 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   comparing an amount of traffic output by a plurality of virtual machines to available processing capacity of a number of existing instances of an application that is configured to process the traffic; and modifying, based on a result of said comparing, the number of existing instances of the application so as to accommodate variations in the amount of traffic in real time.

2. The method of claim 1, wherein said modifying comprises:
creating a new instance of the application responsive to a determination that the amount of traffic exceeds a predetermined amount of the available processing capacity.

3. The method of claim 1, wherein said modifying comprises:
removing an existing instance of the application responsive to a determination that the amount of traffic falls below a predetermined amount of the available processing capacity.

4. The method of claim 1, wherein each instance of the application has a fixed processing capacity that limits how much traffic can be handled at one time.

5. The method of claim 1, wherein each instance of the application executes on a different network appliance.

6. The method of claim 1, further comprising:
causing the traffic to be distributed amongst the existing instances of the application to prevent dropping of data packets.

7. The method of claim 1, further comprising:
acquiring, via an application programming interface, the traffic that is indicative of data packets output by the plurality of virtual machines hosted on a multi-tenant cloud computing platform;
wherein said comparing is performed repeatedly as the traffic is acquired.

8. A non-transitory computer-readable medium with instructions stored thereon that, when executed by a processor of a computing device, cause the computing device to perform operations comprising:
determining that traffic indicative of data packets handled by a plurality of virtual machines hosted on a multi-tenant cloud computing platform exceeds a capacity limitation of a first instance of an application;
creating, in real time responsive to said determining, a second instance of the application; and
separating the traffic into (i) a first group of data packets to be processed by the first instance of the application and (ii) a second group of data packets to be processed by the second instance of the application.

9. The non-transitory computer-readable medium of claim 8, wherein said separating comprises:
generating a hash value for each data packet included in the traffic to produce a plurality of hash values,
accessing a data structure that maps the plurality of hash values amongst a plurality of instances of the application,
determining that each data packet in the first group of data packets corresponds to an entry in the data structure that specifies the first instance of the application, and
determining that each data packet in the second group of data packets corresponds to an entry in the data structure that specifies the second instance of the application.

10. The non-transitory computer-readable medium of claim 9, wherein each instance of the application is executed in a different node of a visibility fabric.

11. The non-transitory computer-readable medium of claim 8, wherein the operations further comprise:
forwarding (i) the first group of data packets to the first instance of the application and (ii) the second group of data packets to the second instance of the application;
forming a filtered stream of data packets by combining at least a portion of the first group of data packets with at least a portion of the second group of data packets.

12. The non-transitory computer-readable medium of claim 11,
wherein the at least a portion of the first group of data packets are those data packets that were not filtered by the first instance of the application, and
wherein the at least a portion of the second group of data packets are those data packets that were not filtered by the second instance of the application.

13. The non-transitory computer-readable medium of claim 11, wherein the operations further comprise:
forwarding the filtered stream of data packets to an egress port for transmission toward a destination.

14. The non-transitory computer-readable medium of claim 13, wherein the destination is the plurality of virtual machines.

15. The non-transitory computer-readable medium of claim 8, wherein the plurality of virtual machines are associated with a single tenant of the multi-tenant cloud computing platform.

16. The non-transitory computer-readable medium of claim 8, wherein the first group of data packets includes all data packets in the traffic that match a first criterion specified in a first flow map, and wherein the second group of data packets includes all data packets in the traffic that match a second criterion specified in a second flow map.

\* \* \* \* \*